(12) United States Patent
Penner et al.

(10) Patent No.: US 12,343,632 B2
(45) Date of Patent: Jul. 1, 2025

(54) SIMULATING REALISTIC BALL BEHAVIOUR IN INTERACTIVE VIDEOGAMES

(71) Applicant: ELECTRONIC ARTS INC., Redwood City, CA (US)

(72) Inventors: Craig Penner, Austin, TX (US); Justin Patel, Orlando, FL (US)

(73) Assignee: Electronic Arts Inc., Redwood City, CA (US)

( * ) Notice: Subject to any disclaimer, the term of this patent is extended or adjusted under 35 U.S.C. 154(b) by 341 days.

(21) Appl. No.: 18/129,171

(22) Filed: Mar. 31, 2023

(65) Prior Publication Data

US 2024/0325914 A1 Oct. 3, 2024

(51) Int. Cl.
| | |
|---|---|
| A63F 13/573 | (2014.01) |
| A63F 13/52 | (2014.01) |
| A63F 13/57 | (2014.01) |
| A63F 13/812 | (2014.01) |
| A63F 13/44 | (2014.01) |

(52) U.S. Cl.
CPC ............ *A63F 13/573* (2014.09); *A63F 13/52* (2014.09); *A63F 13/57* (2014.09); *A63F 13/812* (2014.09); *A63F 13/44* (2014.09); *A63F 2300/64* (2013.01); *A63F 2300/646* (2013.01); *A63F 2300/8011* (2013.01)

(58) Field of Classification Search
CPC ...... A63F 13/812; A63F 13/573; A63F 13/57; A63F 13/44; A63F 2300/64; A63F 2300/646; A63F 2300/8011
See application file for complete search history.

(56) References Cited

U.S. PATENT DOCUMENTS

| | | | | |
|---|---|---|---|---|
| 5,146,557 | A * | 9/1992 | Yamrom | G06T 15/00 |
| | | | | 715/974 |
| 5,319,548 | A * | 6/1994 | Germain | A63B 71/06 |
| | | | | 273/DIG. 26 |
| 7,270,601 | B2 * | 9/2007 | Takahashi | A63F 13/812 |
| | | | | 463/3 |
| 8,319,786 | B2 * | 11/2012 | Endo | G06T 15/80 |
| | | | | 345/426 |

(Continued)

*Primary Examiner* — William H McCulloch, Jr.
(74) *Attorney, Agent, or Firm* — Lowenstein Sandler LLP

(57) ABSTRACT

An example method of simulating dribbling ball behavior in interactive videogames includes: determining, a current spatial position of a simulated ball rolling on a surface of a simulated terrain; determining, based on a slope of the surface of the simulated terrain, a likelihood of ball dribbling; identifying a segment of a path of the simulated ball over the surface from the current spatial position of the simulated ball, such that a dribbling criterion based on the likelihood of ball dribbling is satisfied on the segment of the path; determining, based on a speed of the simulated ball, a dribble-simulating surface angle adjustment range; choosing a dribble-simulating surface angle adjustment value from the dribble-simulating surface angle adjustment range; adjusting, based on the dribble-simulating surface angle adjustment value, a surface normal of a segment of the surface on the path; and determining, based on the adjusted surface normal, a next spatial position of the simulated ball.

20 Claims, 12 Drawing Sheets

(56) References Cited

U.S. PATENT DOCUMENTS

| | | | | |
|---|---|---|---|---|
| 8,974,301 | B2* | 3/2015 | Suzuki | A63F 13/211 |
| | | | | 463/43 |
| 9,643,092 | B2* | 5/2017 | Meadows | A63F 13/216 |
| 10,118,097 | B2* | 11/2018 | Stevens | A63F 13/52 |
| 10,478,730 | B1* | 11/2019 | Burnett | A63F 13/20 |
| 11,007,440 | B2* | 5/2021 | Burnett | A63F 13/32 |
| 11,083,953 | B2* | 8/2021 | Hermandorfer | G06T 11/60 |
| 11,562,523 | B1* | 1/2023 | Starke | G06V 40/23 |
| 11,654,355 | B2* | 5/2023 | Muramori | A63F 13/42 |
| | | | | 463/37 |
| 11,925,865 | B2* | 3/2024 | Yamamura | A63F 13/56 |
| 12,023,586 | B2* | 7/2024 | Yamamura | A63F 13/45 |
| 12,138,543 | B1* | 11/2024 | Starke | G06T 13/80 |
| 2005/0101415 | A1* | 5/2005 | Sweeney | A63B 69/3676 |
| | | | | 473/407 |
| 2008/0293488 | A1* | 11/2008 | Cheng | A63F 13/10 |
| | | | | 463/31 |
| 2009/0189982 | A1* | 7/2009 | Tawiah | A63B 71/0605 |
| | | | | 463/31 |
| 2013/0085018 | A1* | 4/2013 | Jensen | A63F 13/812 |
| | | | | 473/404 |
| 2017/0169142 | A1* | 6/2017 | Van der Velden | G06F 30/20 |
| 2017/0304705 | A1* | 10/2017 | Hermandorfer | A63B 69/0002 |
| 2021/0220739 | A1* | 7/2021 | Zinno | A63F 13/56 |
| 2021/0370174 | A1* | 12/2021 | Yamamura | A63F 13/573 |
| 2022/0168643 | A1* | 6/2022 | Yamamura | A63F 13/573 |
| 2023/0302367 | A1* | 9/2023 | Iwasa | A63F 13/69 |
| 2024/0325914 | A1* | 10/2024 | Penner | A63F 13/573 |

* cited by examiner

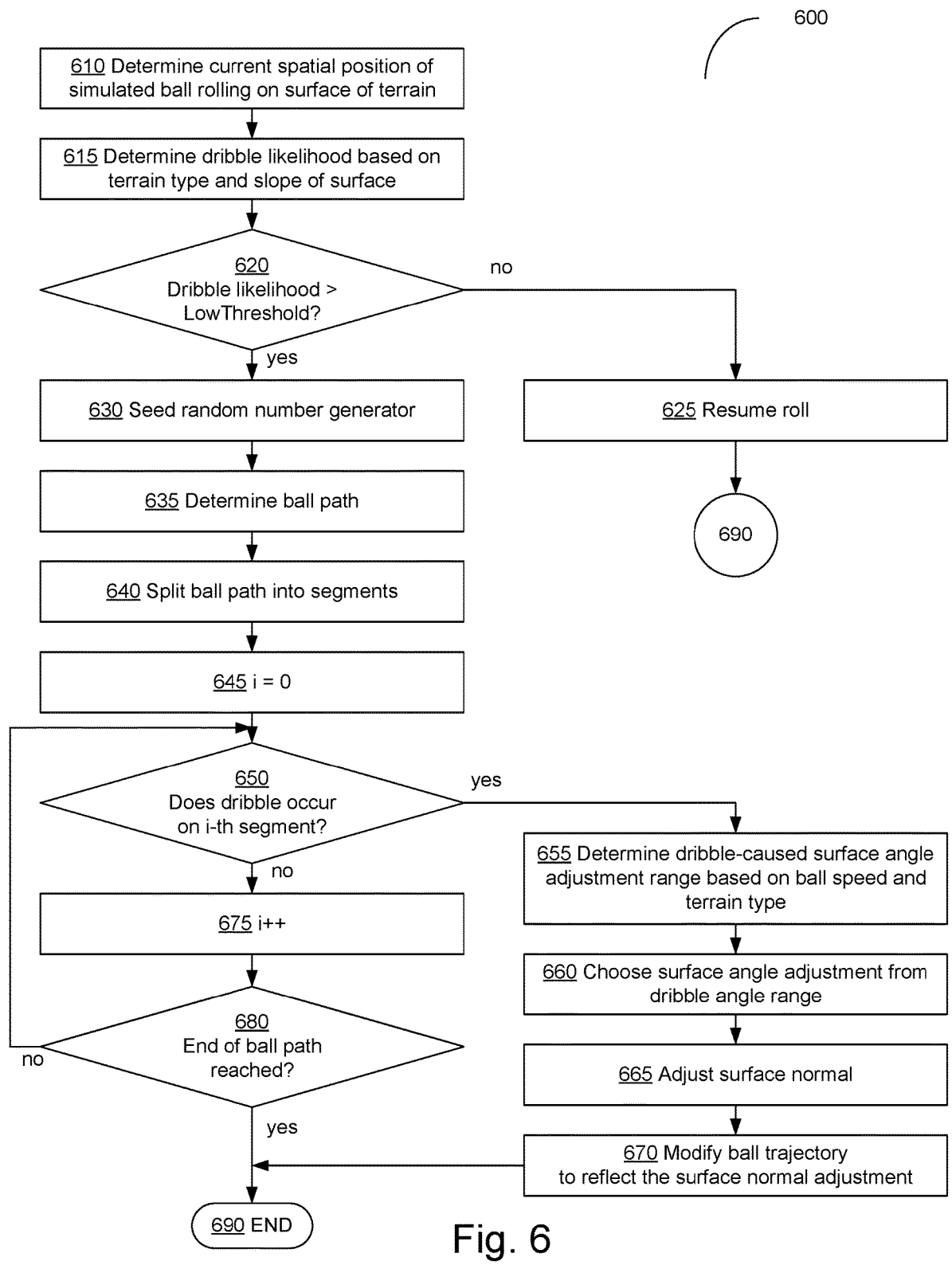

SIMULATING REALISTIC BALL BEHAVIOUR IN INTERACTIVE VIDEOGAMES

TECHNICAL FIELD

The present disclosure is generally related to interactive videogames, and is more specifically related to simulating realistic ball behavior in interactive video games.

BACKGROUND

An interactive videogame may be implemented by a distributed computer system (also referred to as a "gaming platform") which is programmed to generate video content based on a game scenario and user inputs received via a keyboard, a pointing device, and/or a game controller. In various illustrative examples, an interactive videogame may simulate a single- or multi-player sports game.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 6 depicts an example method of simulating dribbling ball behavior in interactive videogames, in accordance with aspects of the present disclosure.

DETAILED DESCRIPTION

Figure 1:
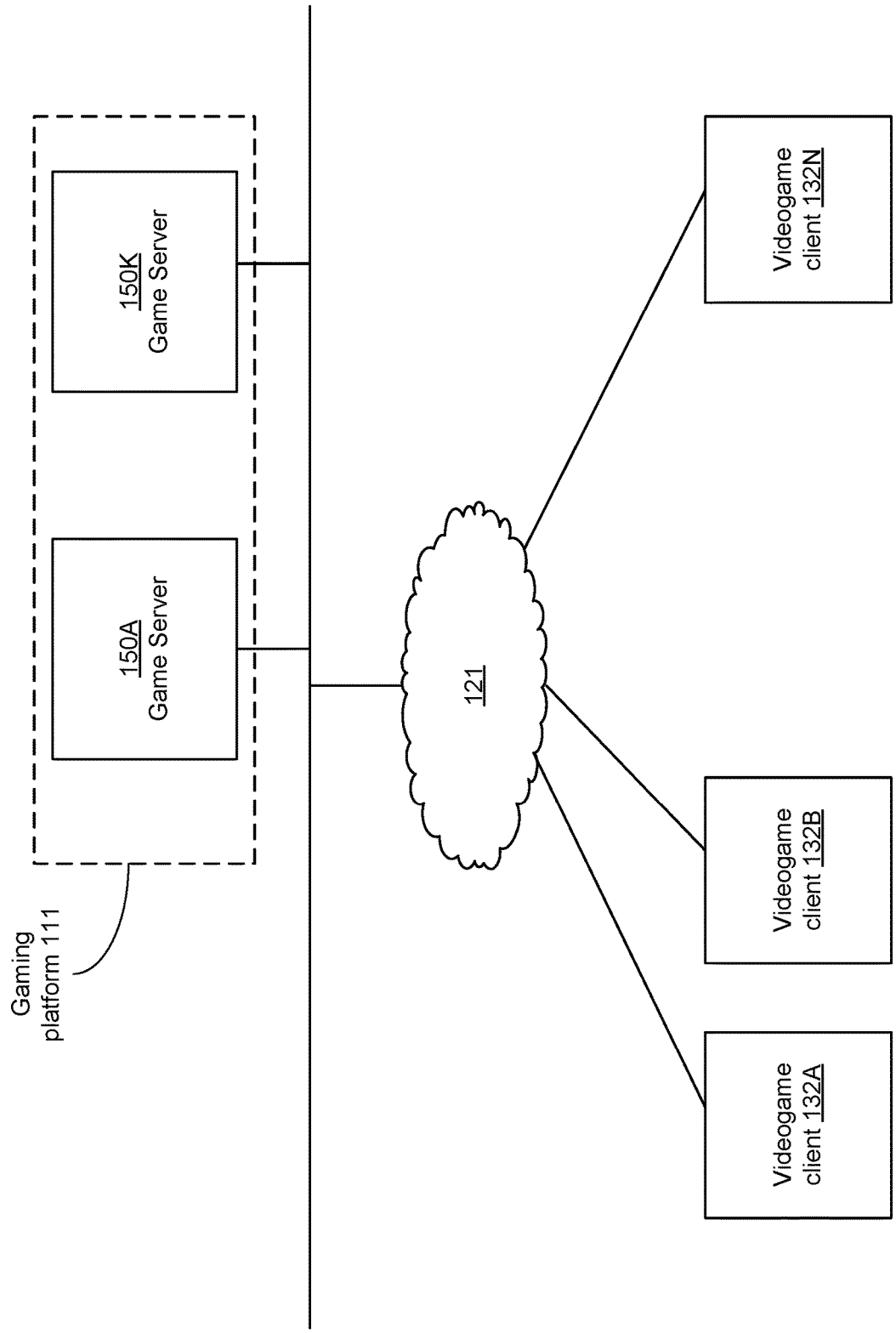
FIG. 1 schematically illustrates a high-level network diagram of an example distributed computer system operating in accordance with one or more aspects of the present disclosure.

Described herein are methods and systems for simulating realistic ball behavior in interactive videogames.

A session of an interactive videogame may be delivered to a videogame client device by an online gaming platform, which may include one or more videogame servers accessible over a network (e.g., the Internet). In an illustrative example, an interactive videogame may simulate a multi-player sports game, in which users of two or more videogame client devices play against each other. Accordingly, a session of the interactive videogame may be played by two or more players connecting simultaneously to the videogame server, such that each player would use their respective videogame client device. Once initiated by the videogame server, the session of the interactive videogame may be represented by a set of session states, such that each session state includes the values of multiple session state variables (e.g., positions and postures of one or more simulated game characters) and a sequence of session events (e.g., the values received from various input devices, such as a keyboard, a pointing device, or a game controller).

A user of an interactive video game may utilize various input devices, such as joysticks, buttons, etc., for controlling movements of various simulated objects in a video game session. In an illustrative example, in an interactive video game of golf, the simulated ball movements are controlled by a golf ball equipped with acceleration sensors enabling advanced motion-tracking technology. The game may include photorealistic imagery of golf courses, player characters, and various game elements.

The game engine may be designed to simulate real-life game physics as closely as possible. In an illustrative example, in the interactive videogame of golf, the trajectory and outcome of each simulated shot may be influenced by various factors, making the gameplay feel authentic and challenging. In various illustrative examples, the ball trajectory and behavior may be affected by the spatial position and orientation of the club and the ball immediately before it hits the ball, the terrain type and quality, the wind, presence of obstacles on the ball trajectory, etc.

The ball trajectory and behavior may be simulated by a physics engine, which applies the laws of physics in order to determine the spatial orientation and position of a simulated ball at every moment of time during the gameplay. In various examples, a ball may exhibit the following types of behavior: flight, spin, bounce, roll, dribble.

In particular, a flying ball would eventually collide with the terrain, which would cause the ball to either bounce or roll along the surface of the terrain. However, the simulated rolling behavior may look unrealistically perfect. In order to make the ball behavior more realistic, the systems and methods of the present disclosure may force a simulated rolling ball to dribble randomly, thus simulating imperfections of the terrain surface.

Rolling as used herein refers to the movement of an object, by rotating or turning over and over, on or relative to an axis or surface. It should be understood that for example, an object rolling on or relative to a surface need not include continuous contact between the object and the surface. That is, an object rolling on a surface can include multiple contacts between the object and the surface, though those contacts can be interrupted while the ball continues to turn over or rotate proximate to (though not in contact with) the surface.

Dribbling as used herein refers to a series of low amplitude bounces of the ball of the surface of the terrain, such that the amplitude of the bounces does not exceed a predefined threshold, which in illustrative example is equal to the ball diameter multiplied by a predefined threshold factor (e.g., ten). Dribbling can be part of a rolling motion of an object. For example, a roll of an object on a surface can include dribbles, which refers to the instances where the ball stops making contact with the surface on which the object is rolling.

In some implementations, each dribble is a collision simulated by the physics engine, which would accordingly modify the ball speed and trajectory. Thus, the realistic ball physics ensures that the ball would respond differently to various surfaces, offering a more engaging gameplay experience.

In some implementations, the physics engine may simulate the ball dribbling by artificially adjusting the angle of a segment of the surface of the terrain on the path of the rolling ball, thus simulating imperfections of the terrain surface and inducing a collision of the ball with the surface of the terrain, as if the ball hit a clump of dirt or grass, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates a high-level network diagram of an example distributed computer system operating in accordance with one or more aspects of the present disclosure. Computing devices, appliances, and network segments are shown in FIG. 1 for illustrative purposes only and do not in any way limit the scope of the present disclosure. Various other computing devices, components, and appliances not shown in FIG. 1, and/or methods of their interconnection may be compatible with the methods and systems for interactive videogame verification by peer videogame clients described herein. Various functional or auxiliary network components (e.g., firewalls, load balancers, network switches, user directories, content repositories, etc.) may be omitted from FIG. 1 for clarity.

As shown in FIG. 1, the gaming platform 111 may one or more game servers 150. In certain implementations, each component of the gaming platform 111 may run on a dedicated computing device (e.g., a hardware server); alternatively, two or more components of the gaming platform 111 may be collocated on a single computing device or within a single virtualized execution environment, and/or a single component may be executed by two or more computing devices or two or more virtualized execution environments, such as virtual machines. In certain implementations, components of the gaming platform 111 may run in a private or public cloud.

A plurality of videogame client devices 132A-132N may connect to the gaming platform 111 via a network 121 (e.g., the Internet). A videogame client device 132 may be provided by a specialized computing device (such as a game console) or a general purpose computing device (such as a personal computer, a tablet, or a smartphone). The videogame client device 132 may run one or more pre-installed and/or dynamically downloadable gaming software modules employed to deliver the video game functionality to the end user, accordance with one or more aspects of the present disclosure. In various illustrative examples, the videogame client device 132 may include one or more user interface devices, such as a touch screen, a video or still image camera, and/or a microphone. For improving the user's gaming experience, the videogame client device 132 may be equipped with a peripheral device functioning as a game controller, which may include a specialized input device that is specific for a particular game or a particular class of games (e.g., a golf ball equipped with acceleration sensors). In certain implementations, the videogame client device 132 may include a display which may be employed for displaying the interactive videogame content. Alternatively, a separate video display appliance in communication with the videogame client device 132 and the online gaming platform 111 may be employed for displaying the interactive videogame content. Upon connecting to the gaming platform 111, the user may employ the videogame client device 132 to browse a game catalog, launch and play interactive video games, and perform various game-related transactions, as described in more details herein below.

Computing devices, appliances, and network segments are shown in FIG. 1 for illustrative purposes only and do not in any way limit the scope of the present disclosure. col11, and/or methods of their interconnection may be compatible with the methods and systems described herein. Various functional or auxiliary network components (e.g., firewalls, load balancers, network switches, user directories, content repositories, etc.) may be omitted from FIG. 1 for clarity.

Figure 2:
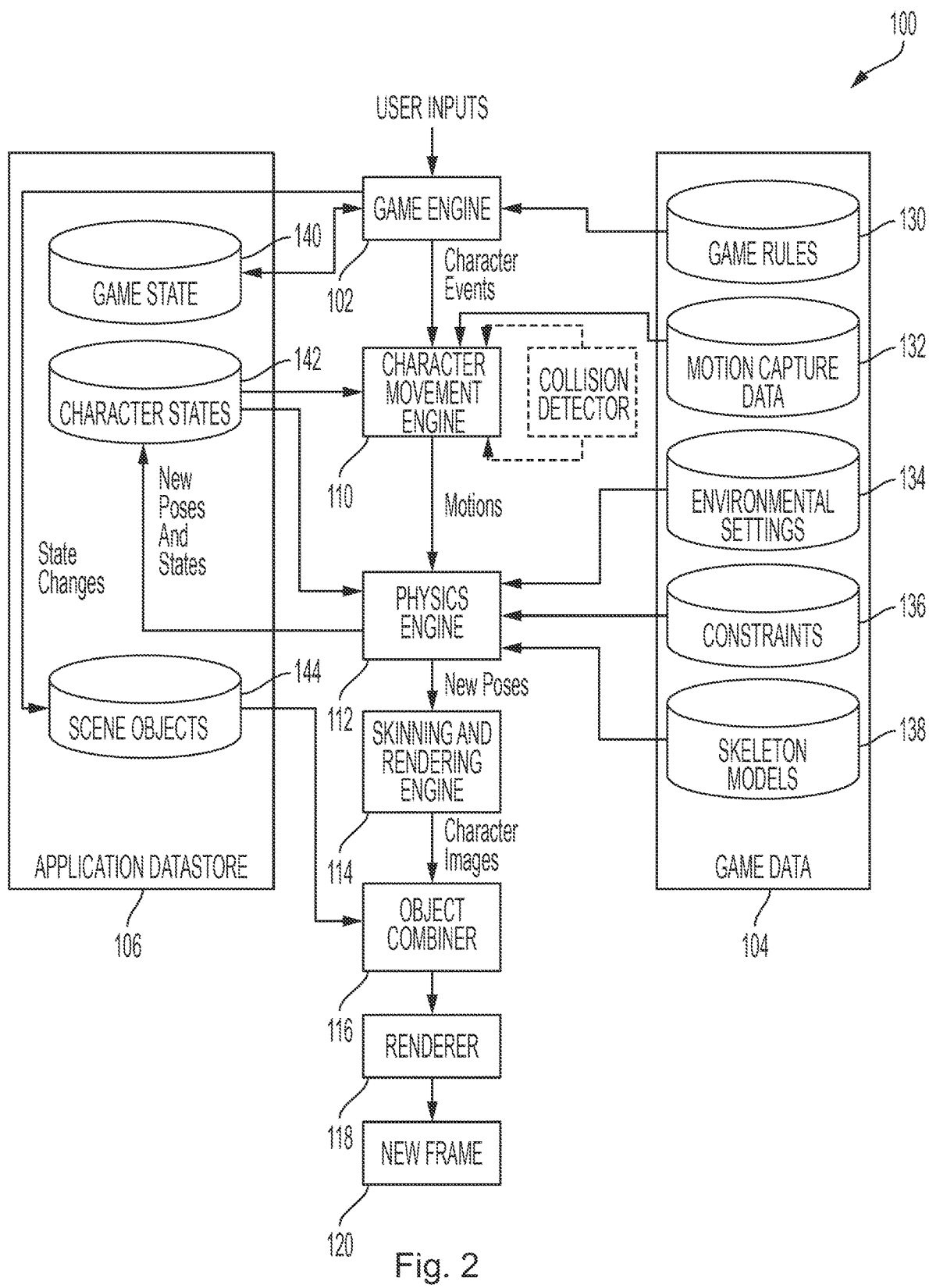
FIG. 2 schematically illustrates a high-level component diagram of the interactive videogame server operating in accordance with aspects of the present disclosure.

FIG. 2 schematically illustrates a high-level component diagram of the interactive videogame server 150 of FIG. 1, in accordance with aspects of the present disclosure. The videogame client 122 receives user input to control aspects of the game according to game rules 130. Game rules 130 might be specified in instruction form on game media 12. Examples of game rules 130 include rules for scoring, possible inputs, actions/events, movement in response to inputs, and the like. Other components can control what inputs are accepted and how the game progresses, and other aspects of gameplay. The elements in FIG. 2 illustrate elements used for generating and rendering animation within the game based on various inputs.

As shown in FIG. 2, user inputs and game code/data may be used by the interactive videogame server 150 to generate video and audio stream to be displayed by one or more game client devices 14. The game system also handles playing the game and presenting corresponding audio output. The game engine 102 receives the user inputs and determines character events, such as actions, collisions, runs, throws, attacks and other events appropriate for the game.

The character events are conveyed to a character movement engine 110 that determines the appropriate motions the characters should make in response to the events and passes those motions on to a physics engine 112. Physics engine 112 determines new poses for the characters and provides those new poses to a skinning and rendering engine 114. Engine 114 in turn provides character images to an object combiner 116 to combine animate, inanimate and background objects into a full scene. The full scene is conveyed to a renderer 118, which generates a new frame 120 therefrom.

Game code/data 104 is shown comprising game rules 130, prerecorded motion capture poses/paths 132, environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 102 reads in game rules 130 and considers game state 140 to arrive at character and ball events. Character movement engine 110 reads in prerecorded poses/paths 132 as well as character states 142. An optional collision detector process can derive the desired motions for characters based on collisions. Motions might be expressed as a set of external forces, target poses and the like. As needed, character movement engine 110 may also use other data elements shown, such as skeleton models 138. Character movement engine 110 might also introduce character movements for randomness, personality, and so forth.

The physics engine 112 has as its inputs the skeleton models of various characters, environmental settings 134, character states such as current poses (for example, positions of body parts expressed as positions, joint angles or other specifications), terrain descriptions, ball positions and velocities. From this information, physics engine 112 generates new ball positions and poses of the characters, providing the results to rendering engine 114. The skinning and rendering engine 114 takes into account the surfaces, colors and textures of the body parts of posed characters and renders character images. Object combiner 116 can then combine the character images with inanimate and background objects obtained from scene objects store 114 to provide a complete scene to renderer 118.

The physics engine 112 may apply the laws of physics in order to determine the trajectory of a simulated ball during the gameplay. In particular, a flying ball may eventually collide with the terrain, which would cause the ball to either bounce or roll along the surface of the terrain. In order to make the ball behavior more realistic, the physics engine 112 may force a simulated rolling ball to dribble randomly, thus simulating imperfections of the terrain surface.

In some implementations, the physics engine 112 may simulate the ball dribbling by artificially adjusting the angle of a segment of the surface of the terrain on the path of the rolling ball, thus simulating imperfections of the terrain surface and inducing a collision of the ball with the surface of the terrain, as if the ball hit a clump of dirt or grass.

In order to simulate the ball dribbling, the physics engine 11 may evaluate the dribble likelihood of a simulated rolling ball. The dribble likelihood may be expressed, e.g., as the probability of a dribble (i.e., a small amplitude bounce of the roll against the terrain surface) occurring within a predefined distance of rolling ball path. "Ball path" herein shall refer to the projection of the ball trajectory onto the terrain surface.

Figure 3A:
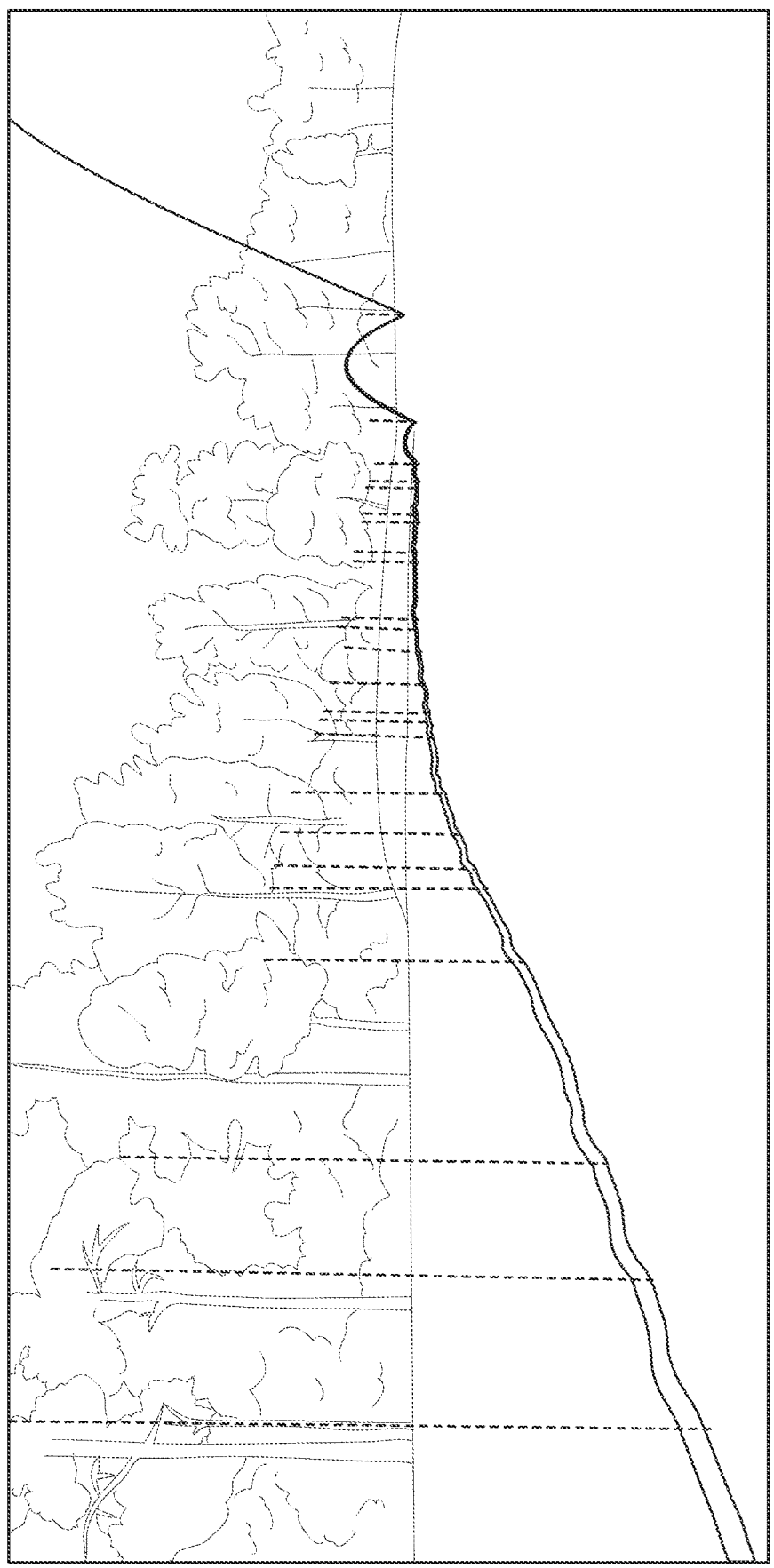
FIGS. 3A-3B illustrate an examples of simulated dribbling on various surfaces, in accordance with aspects of the present disclosure.
Figure 3B:
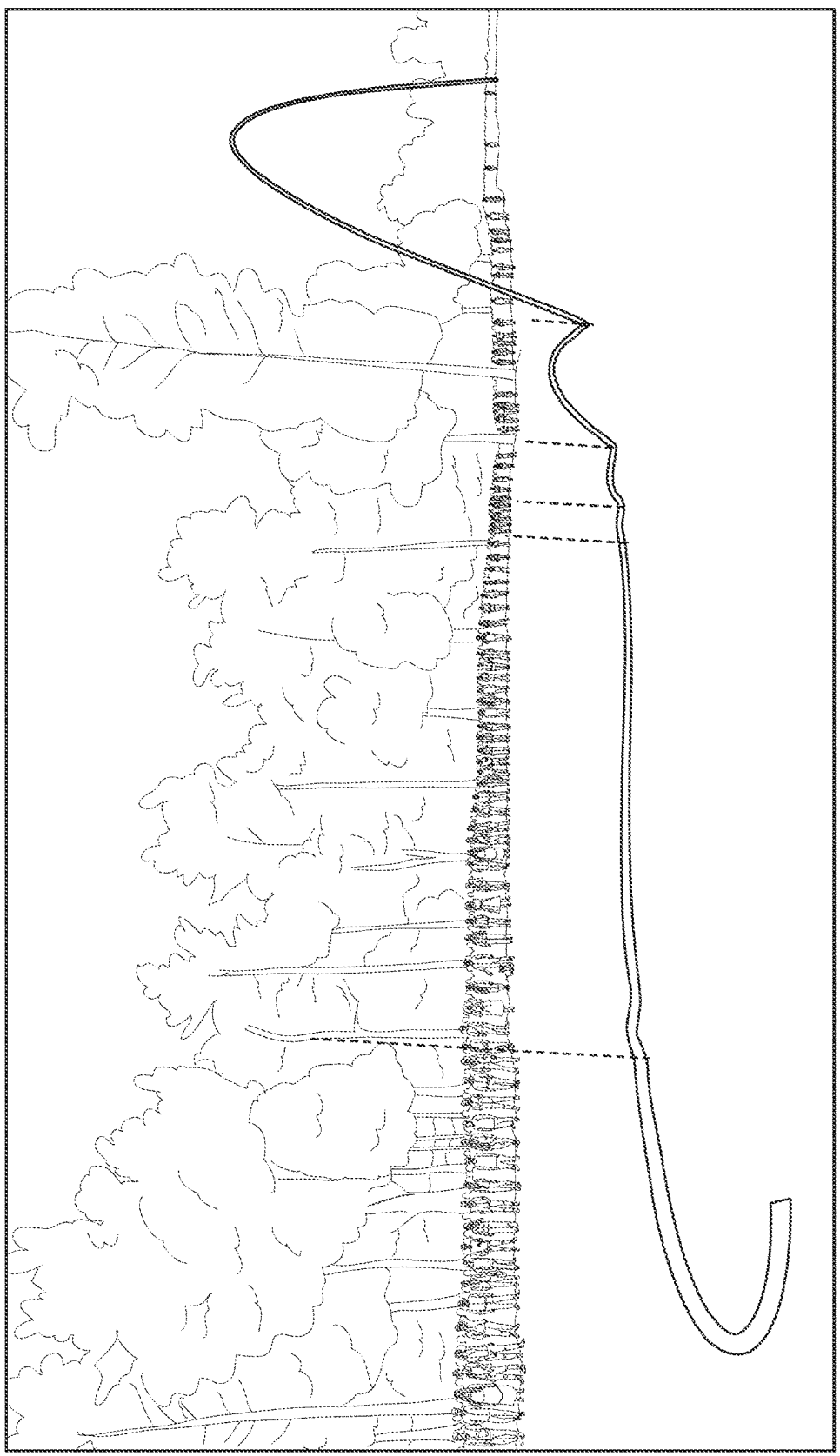

FIGS. 3A-3B illustrates examples of simulated dribbling on a downhill surface and an uphill surface, respectively. As can be seen from these figures, the dribble likelihood may depend on the slope of the surface of the terrain, thus reflecting the observation that dribbling is more likely to occur on horizontal or slightly downhill paths, less likely to occur on uphill paths and is very unlikely or impossible to occur on acute uphill and downhill paths.

In some implementations, the dribble likelihood may further depend on physical characteristics of the simulated terrain, thus reflecting the observation that dribbling is less likely to occur on smooth surfaces (such as green surfaces) and is more likely to occur on rougher surfaces (such as fairways). Very rough surfaces, such that mulch or pine straw surfaces, would cause the highest likelihood of dribbling. Accordingly, in some implementations, for every terrain type of a set of known terrain types, the dribble likelihood may be described by a monotonically non-increasing function of the slope of the surface of the terrain.

Figure 4A:
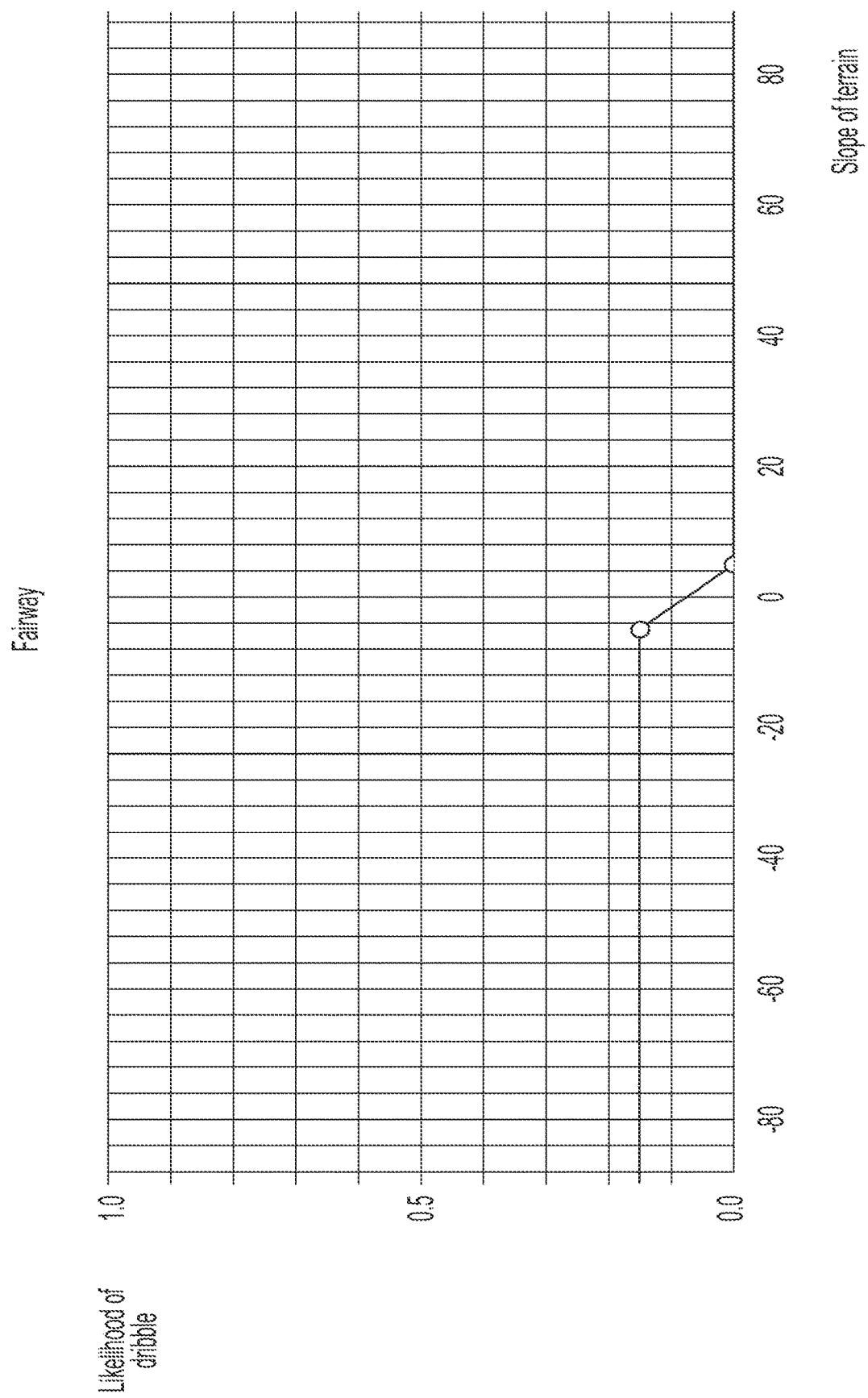
FIGS. 4A-4B schematically illustrate dependencies of dribble likelihood on the slope of the surface of the terrain for various terrain types, in accordance with aspects of the present disclosure.
Figure 4B:
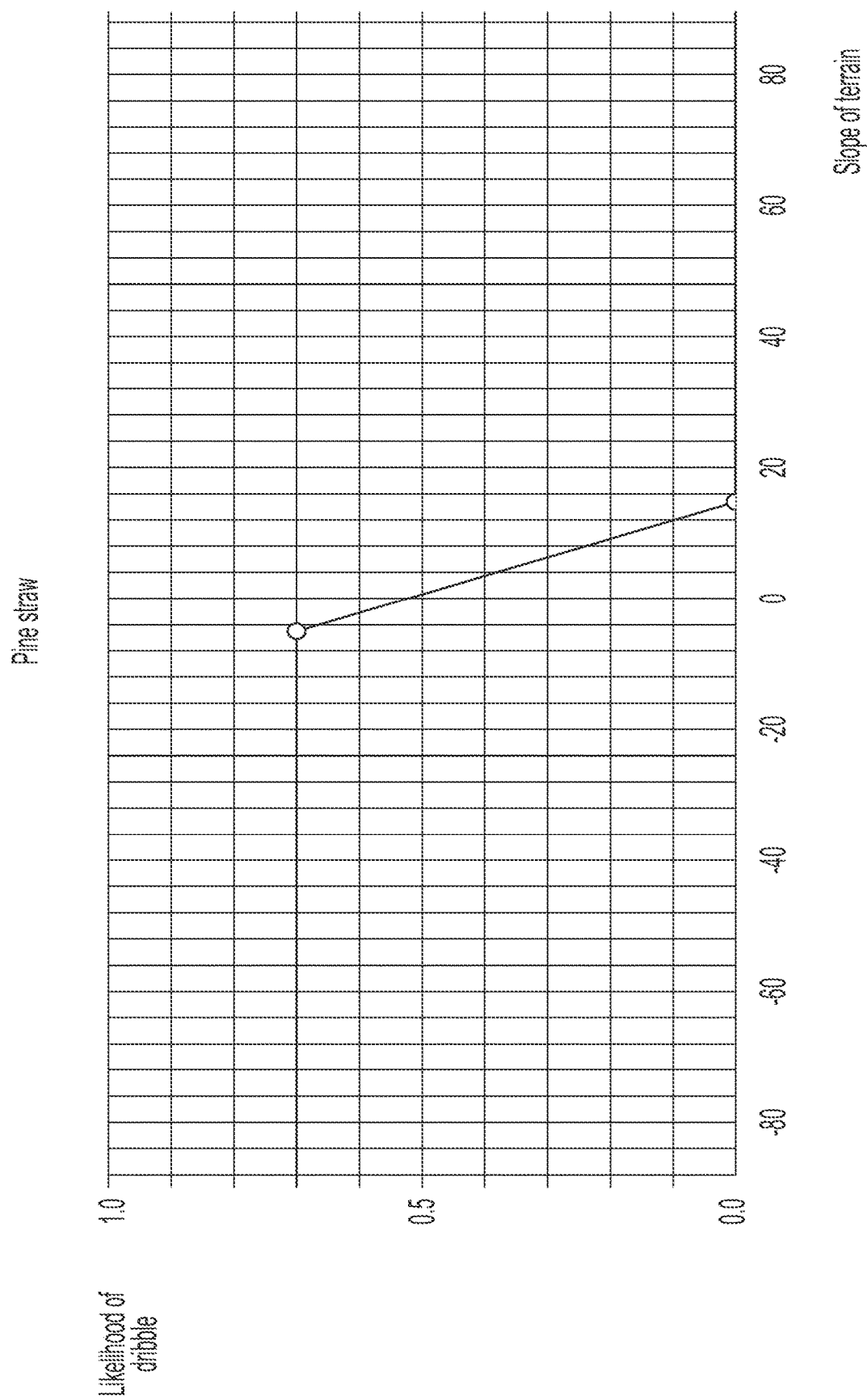

FIGS. 4A-4B schematically illustrate dependencies of dribble likelihood on the slope of the surface of the terrain for various terrain types. In particular, FIG. 4A schematically illustrates example dependency of dribble likelihood on the slope of the surface of the terrain for a fairway terrain, and FIG. 4B schematically illustrates example dependency of dribble likelihood on the slope of the surface of the terrain for a pine straw terrain. As schematically illustrated by FIGS. 4A-4B, the dependency of dribble likelihood on the slope of the surface of the terrain for a given terrain type may be described by a piecewise linear function, which yields a positive value for negative slopes not exceeding a predefined negative slope, then monotonically decreases reaching zero value at a predefined positive slope, and stays at zero for all positive slopes exceeding the predefined positive slope. As seen from the comparison of FIGS. 4A and 4B, for a given terrain slope, the dribble likelihood on a more rough surface (pine straw in FIG. 4B) would exceed the dribble likelihood on a more smooth surface (fairway in FIG. 4A).

The physics engine 112 may then compare the determined terrain-specific slope-dependent dribble likelihood to a predefined low threshold value (e.g., 0.01). Should the dribble likelihood be found to fall below the low threshold value, the physics engine may assume that no dribbling should be simulated, and continue simulating the rolling behavior of the ball. Conversely, should the dribble likelihood be found equal to or exceeding the low threshold value, the physics engine may simulate the dribbling behavior of the ball by performing the operations described herein below.

Simulating the dribbling behavior may involve splitting the ball path into multiple segments and determining whether a simulated dribble should be performed at any of the segments. The ball path may be constructed as a straight line over the surface of the terrain from the current ball position to the next known position, which is either the estimated end of the rolling path or a predicted collision position if the ball trajectory intersects with an object.

The segments into which the path is split may be of an equal predefined size (e.g., one feet), in which case the last segment may have a lesser size. For segments having lesser than predefined size, the dribble likelihood may be scaled down (e.g., linearly).

The physics engine 112 may iterate through the segments of the path and, for each segment, evaluate a dribbling criterion in order to determine whether a dribble would occur in the segment. Evaluating the dribbling criterion may involve comparing the determined dribble likelihood to a pseudo-random value returned by a random number generator. In some implementations, the random number generator may be seeded by a value derived from the current position of the ball (e.g., the product of the three coordinates of the current ball position). Seeding the random number generator in this manner would ensure that the balls hitting in the same position would have the same pseudo-random dribbling pattern.

Accordingly, in an illustrative example, the dribble is determined to occur on a given segment of the ball path if the dribble likelihood exceeds a pseudo-random value returned by the random number generator. Then, the physics engine 112 may determine a surface angle adjustment range for artificially adjusting the angle of a segment of the surface of the terrain on the path of the rolling ball, thus inducing a collision of the ball with the surface of the terrain.

In some implementations, the physics engine 112 may pseudo-randomly select the dribble-simulating angle adjustment from a range of angle adjustment values, which, for a given terrain type, may depend upon the speed of the ball, thus ensuring that slower balls dribble more, while fast moving balls would not be transitioning into a high amplitude bouncing mode.

In some implementations, the range of dribble-simulating angle adjustment values may further depend on physical characteristics of the simulated terrain, thus reflecting the observation that dribbling is less likely to occur on smooth surfaces (such as green surfaces) and is more likely to occur on rougher surfaces (such as fairways). Accordingly, very rough surfaces, such that mulch or pine straw surfaces, would be simulated by higher range of angle adjustment values as compared to less rough surfaces, such as fairways. Thus, in some implementations, for every terrain type of a set of known terrain types, each one of the lower and upper limits of the range of dribble-simulating angle adjustment values may be described by a corresponding monotonically non-increasing function of the slope of the speed of the ball.

Figure 5A:
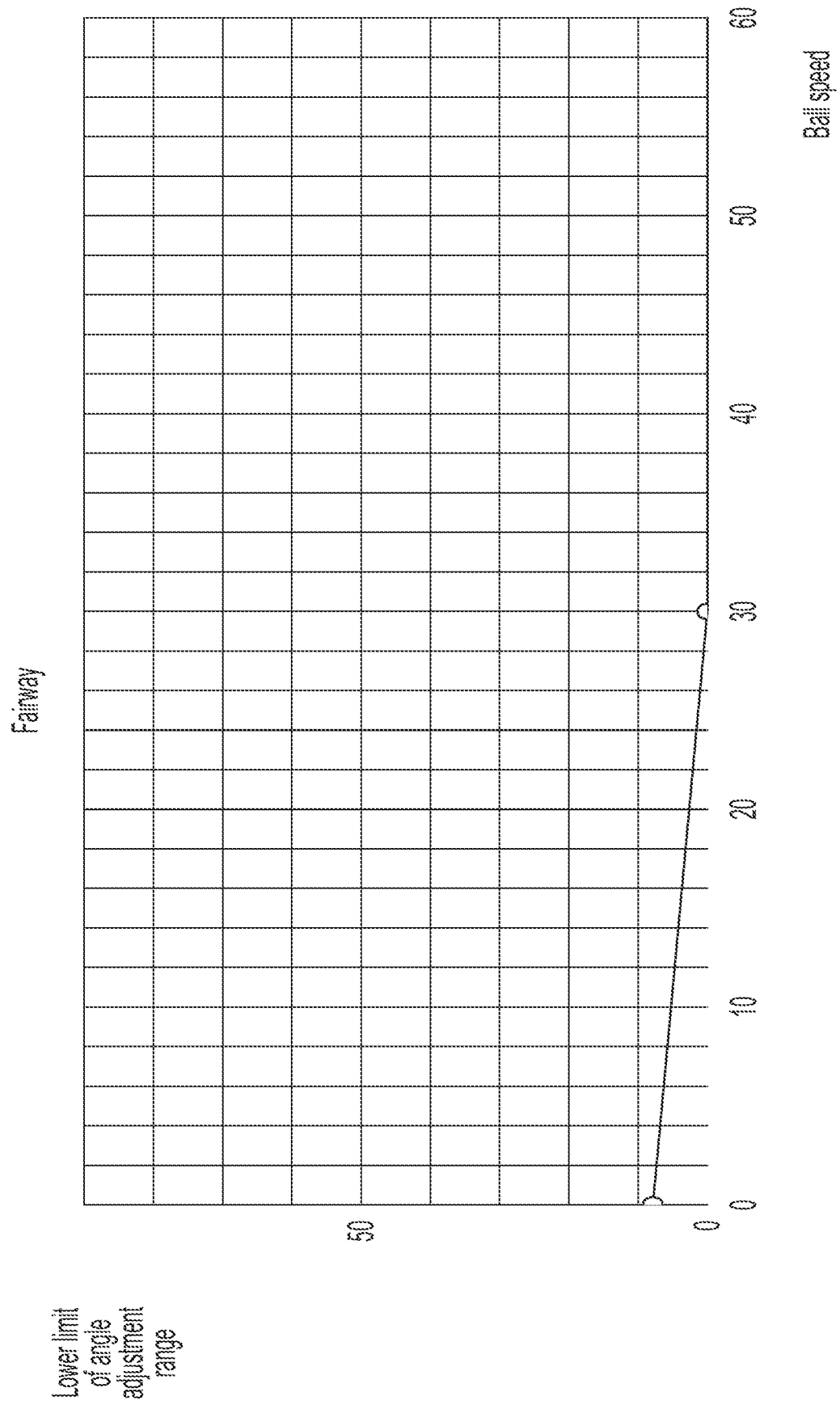
FIGS. 5A-5D schematically illustrate dependencies of dribble-simulating angle adjustment values on the ball speed for various terrain types, in accordance with aspects of the present disclosure.
Figure 5B:
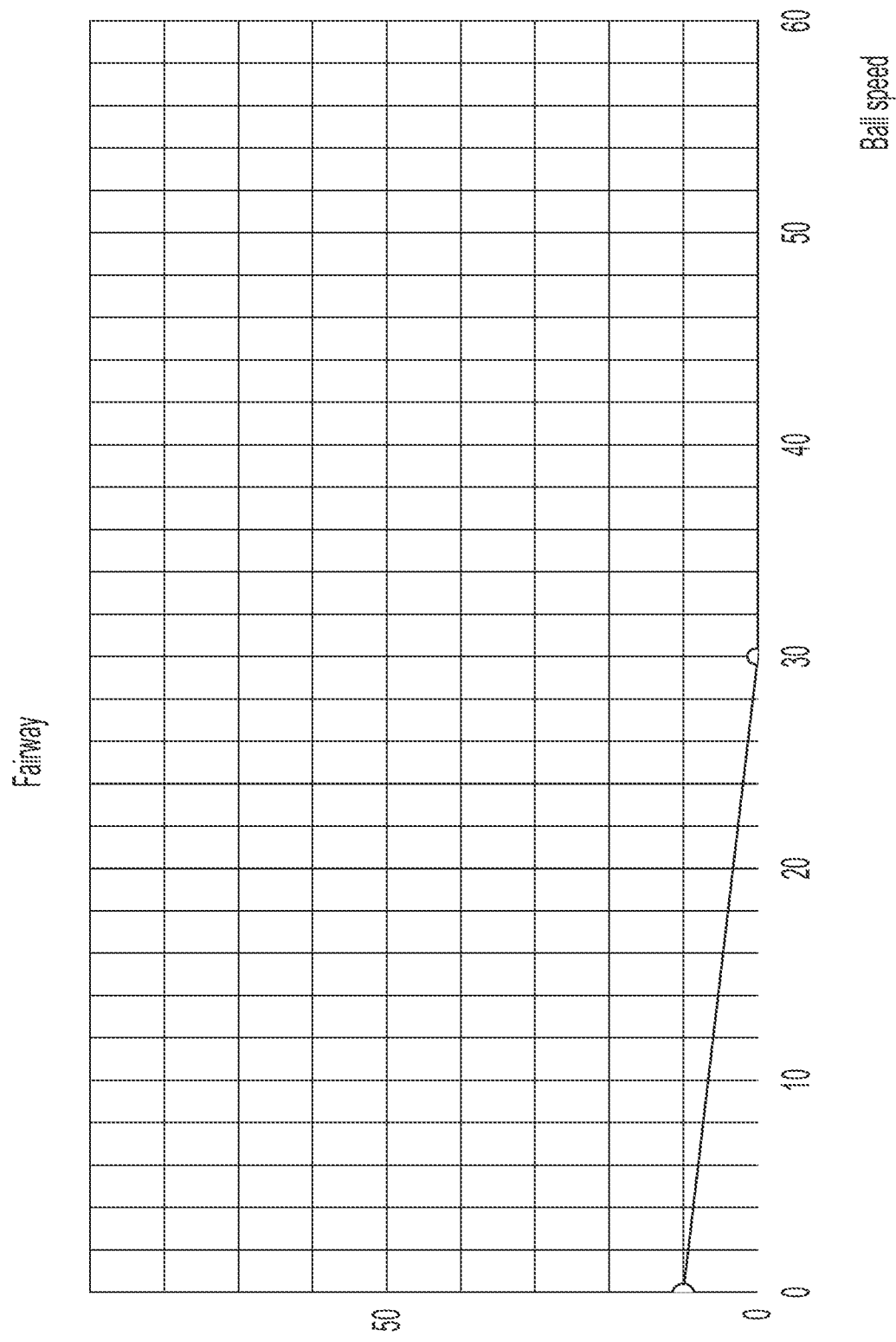

FIGS. 5A-5D schematically illustrate dependencies of dribble-simulating angle adjustment values on the ball speed for various terrain types. In particular, FIG. 5A schematically illustrates example dependency of the lower limit of the range of dribble-simulating angle adjustment values on the ball speed for a fairway terrain, and FIG. 5B schematically illustrates example dependency of the upper limit of the range of dribble-simulating angle adjustment values on the ball speed for the fairway terrain.

Figure 5C:
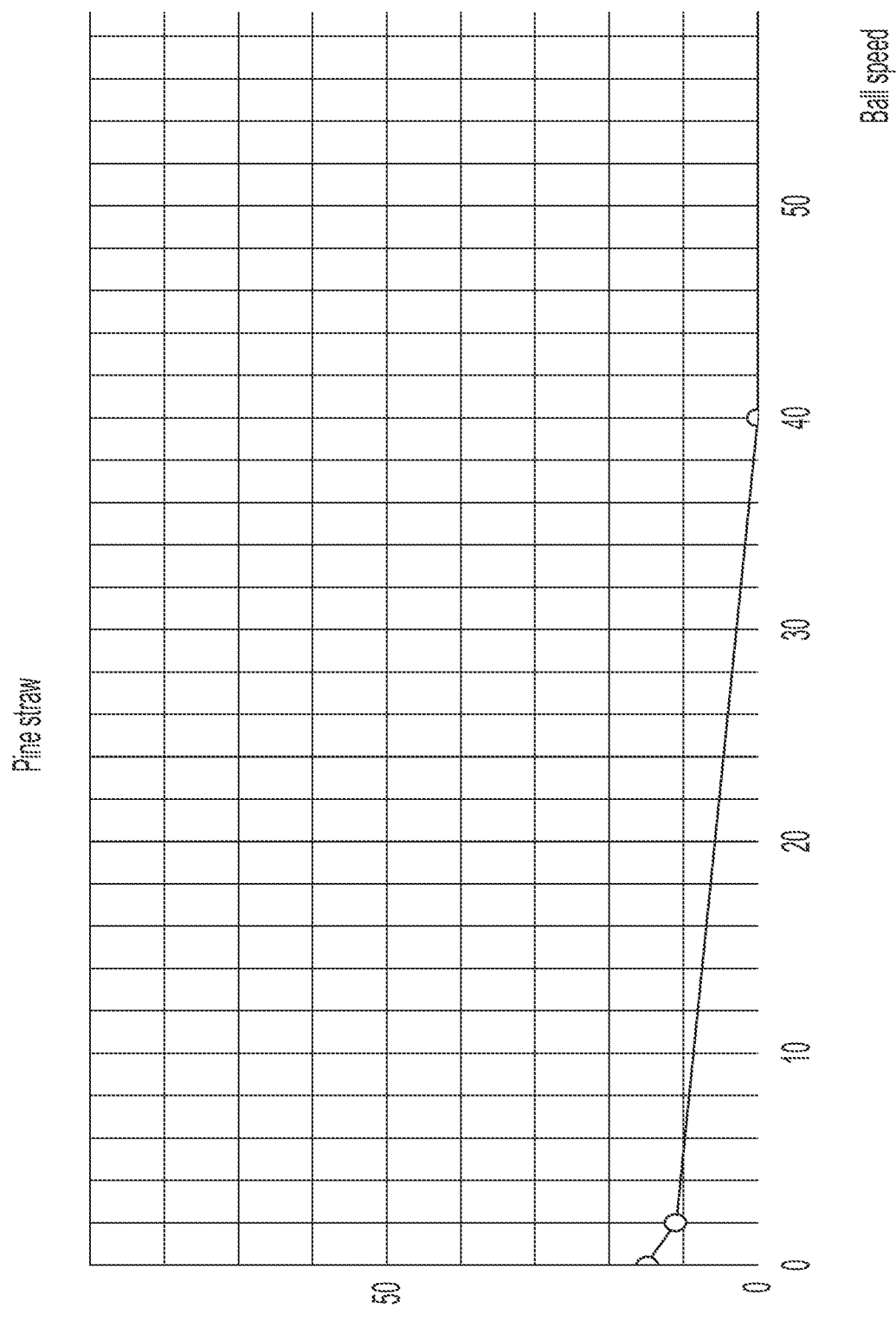
Figure 5D:
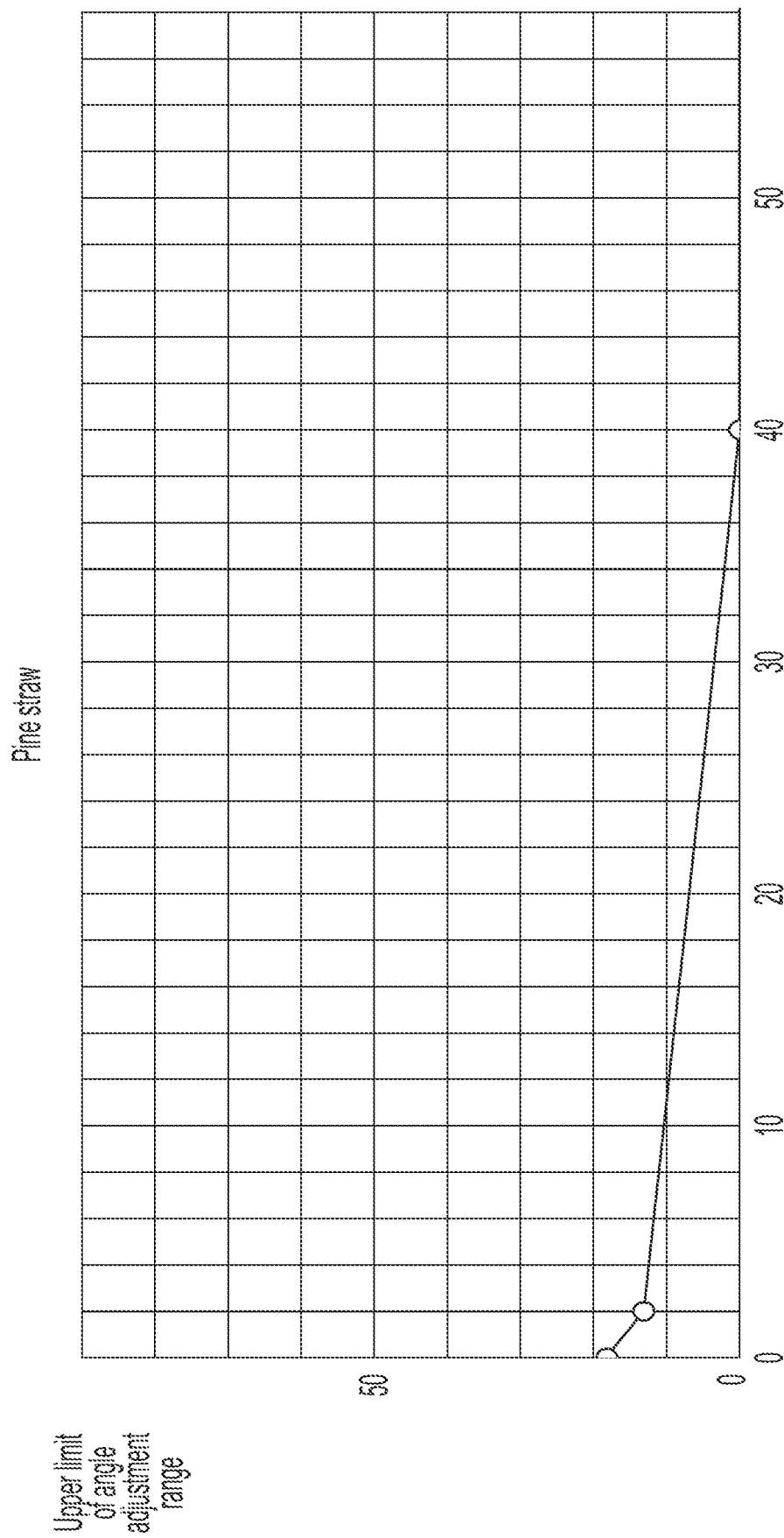

Similarly, FIG. 5C schematically illustrates example dependency of the lower limit of the range of dribble-simulating angle adjustment values on the ball speed for a pine straw terrain, and FIG. 5D schematically illustrates example dependency of the upper limit of the range of dribble-simulating angle adjustment values on the ball speed for the pine straw terrain.

As schematically illustrated by FIGS. 5A-5D, the dependency of each one of the lower and upper limits of dribble-simulating angle adjustment values on the ball speed for a given terrain type may be described by a piecewise linear function, which yields monotonically decreasing positive values for ball speeds below a predefined ball speed, at which it reaches zero value, and stays at zero for all ball speeds exceeding the predefined ball speed.

In an illustrative example, selecting the dribble-simulating angle adjustment from a range of angle adjustment values may involve selecting a value between the low and upper limits of the range at a point on a linear scale, such that the point is identified by a pseudo-random value returned by a random number generator. In some implementations, the random number generator may be seeded by a value derived from the current position of the ball (e.g., the product of the three coordinates of the current ball position). Seeding the random number generator in this manner would ensure that the balls hitting in the same position would have the same pseudo-random dribbling pattern.

Upon determining the dribble-simulating angle adjustment, the physics engine 112 may adjust the surface normal of a segment of the surface on the ball path, thus simulating imperfections of the terrain surface and inducing a collision of the ball with the surface of the terrain, as if the ball hit a clump of dirt or grass. The collision would cause the ball speed and trajectory to be modified by the physics engine 112.

Thus, the physics engine 112 may determine the new ball direction and initial speed resulted from the dribble-simulated collision, and may further determine the next position of the simulated ball, which can be, e.g., point of another collision or a starting point of another surface roll. Accordingly, the physics engine 112 may determine the ball trajectory from the point of collision to the predicted next position.

FIG. 6 depicts an example method 600 of simulating dribbling ball behavior in interactive videogames, in accordance with aspects of the present disclosure. In an illustrative example, method 600 may be implemented by the physics engine 112 of FIG. 1. Method 600 and/or each of its individual functions, routines, subroutines, or operations may be performed by one or more processors of a computing device (e.g., computing device 700 of FIG. 7). In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel and/or in arbitrary chosen orders. Furthermore, one or more operations can be omitted in various implementations.

As schematically illustrated by FIG. 6, at operation 610, the computing device implementing the method determines a current spatial position of a simulated ball rolling on a surface of a simulated terrain, as described in more detail herein above.

At operation 615, the computing device determines, based on the slope of the surface of the simulated terrain, a likelihood of ball dribbling. In some implementations, for every terrain type of a set of known terrain types, the dribble likelihood may be described by a monotonically non-increasing function of the slope of the surface of the terrain, as described in more detail herein above.

Responsive to determining, at operation 620, that the dribble likelihood exceed a predefined low threshold, the processing continues at operation 630; otherwise, at operation 625, the rolling behavior of the simulated ball is resumed, and the method terminates at operation 690.

At operation 630, the computing device seeds a random number generator by a value derived from the current position of the ball (e.g., the product of the three coordinates of the current ball position), as described in more detail herein above.

At operation 635, the computing device determines the path of the simulated ball. The ball path may be constructed as a straight line over the surface of the terrain from the current ball position to the next known position, which is either the estimated end of the rolling path or a predicted collision position if the ball trajectory intersects with an object, as described in more detail herein above.

At operation 640, the computing device splits the simulated ball path into a sequence of path segments. The segments into which the path is split may be of an equal predefined size (e.g., one feets), in which case the last segment may have a lesser size. For segments having lesser than predefined size, the dribble likelihood may be scaled down (e.g., linearly), as described in more detail herein above.

At operations 645-675, the computing device iterates over the path segments in order to identify a segment on which a dribbling criterion is satisfied. In particular, at operation 645, the processing devices initializes (e.g., to zero value) the counter of path segments.

At operation 650, the computing device determines whether a simulated dribble occurs on the current segment of the path. In an illustrative example, the dribble is determined to occur on a given segment of the ball path if the dribble likelihood exceeds a pseudo-random value returned by the random number generator, as described in more detail herein above. Responsive to determining, at operation 650, that a simulated dribble occurs on the current segment of the path, the computing device, at operation 655, determines a dribble-simulating surface angle adjustment range. For every terrain type of a set of known terrain types, each one the lower and upper limits of the range of dribble-simulating angle adjustment values may be described by a corresponding monotonically non-increasing function of the ball speed, as described in more detail herein above.

At operation 660, the computing device chooses a dribble-simulating surface angle adjustment value from the dribble-simulating surface angle adjustment range. In some implementations, the computing device may pseudo-randomly select the dribble-simulating angle adjustment from a range of angle adjustment values, which, for a given terrain type, may depend upon the speed of the ball, as described in more detail herein above.

At operation 665, the computing device adjusts, based on the dribble-simulating surface angle adjustment value, the surface normal of a segment of the surface on the ball path, as described in more detail herein above.

At operation 670, the computing device modifies the ball trajectory to reflect the surface normal adjustment. The computing device may determine the new ball direction and initial speed resulted from the dribble-simulated collision and may further determine the next position of the simulated ball, which can be, e.g., point of another collision or a starting point of another surface roll. Accordingly, the computing device may determine the ball trajectory from the point of collision to the predicted next position. Upon completing the operation 670, the method terminates at operation 690.

Responsive to determining, at operation 650, that a simulated dribble does not occur on the current segment of the path, the computing device, at operation 675, increments the counter of path segments.

Responsive to determining, at operation 680, that the end of ball path has not been reached, the method loops back to operation 650; otherwise, the method terminates at operation 690.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 7:
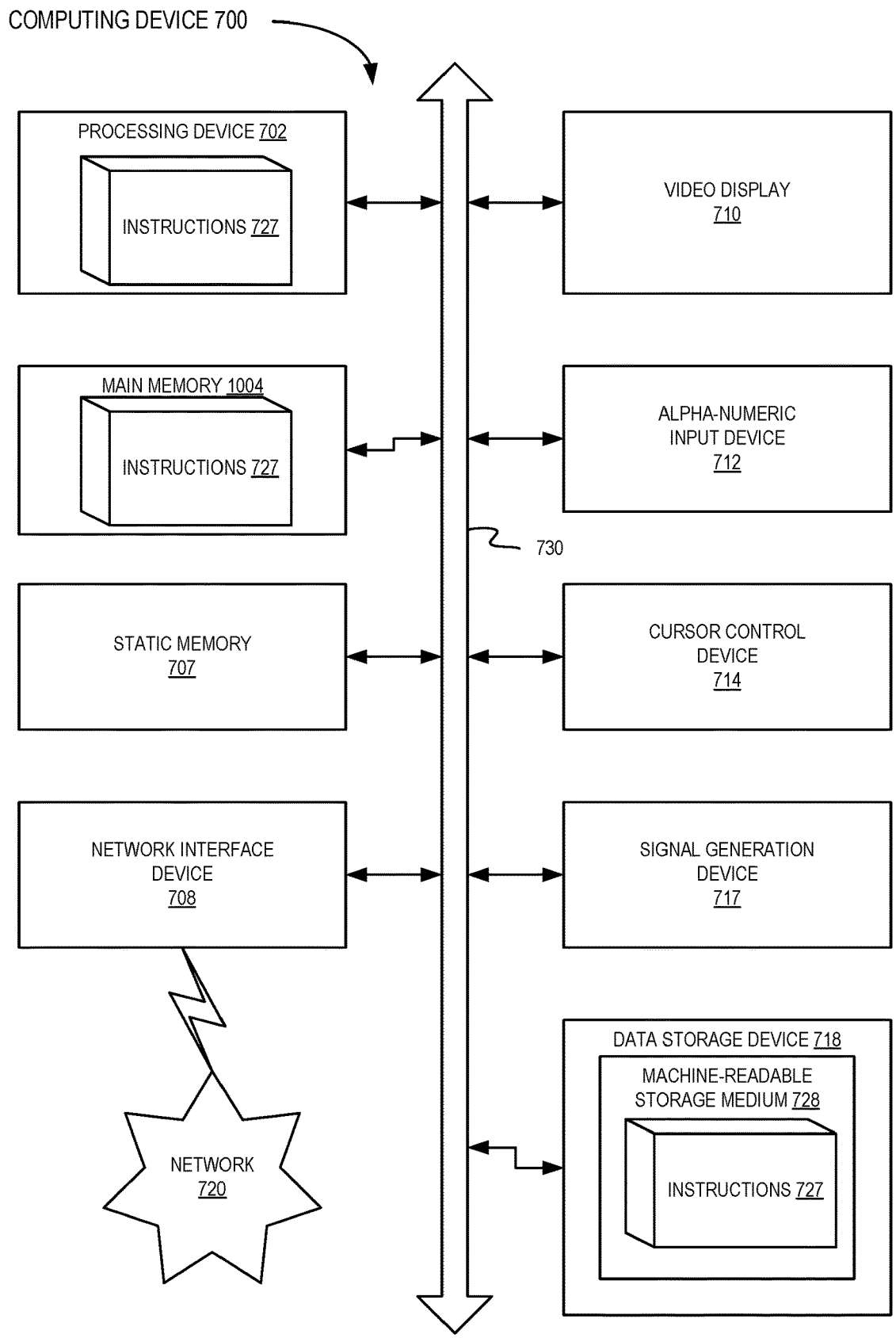
FIG. 7 schematically illustrates a diagrammatic representation of an example computing device which may implement the systems and methods described herein.

FIG. 7 schematically illustrates a diagrammatic representation of a computing device 700 which may implement the systems and methods described herein. Computing device 700 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor) 702, a main memory 704 (e.g., synchronous dynamic random access memory (DRAM), read-only memory (ROM)), a static memory 707 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute instructions 727 implementing method 600 of simulating dribbling ball behavior in interactive videogames, in accordance with aspects of the present disclosure.

Computing device 700 may further include a network interface device 707 which may communicate with a network 720. The computing device 700 also may include a video display unit 77 (e.g., a liquid crystal display (LCD) or a cathode ray tube (CRT)), an alphanumeric input device 712 (e.g., a keyboard), a cursor control device 714 (e.g., a mouse) and an acoustic signal generation device 717 (e.g., a speaker). In one embodiment, video display unit 77, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions 727 implementing method 600 of simulating dribbling ball behavior in interactive videogames, in accordance with aspects of the present disclosure. Instructions 727 may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 707.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   determining, by a processing device implementing an interactive video game, a current spatial position of a simulated ball rolling on a surface of a simulated terrain;
   determining, based on a slope of the surface of the simulated terrain, a likelihood of ball dribbling;
   identifying a segment of a path of the simulated ball over the surface from the current spatial position of the simulated ball, such that a dribbling criterion based on the likelihood of ball dribbling is satisfied on the segment of the path;
   determining, based on a speed of the simulated ball, a dribble-simulating surface angle adjustment range;
   choosing a dribble-simulating surface angle adjustment value from the dribble-simulating surface angle adjustment range;
   adjusting, based on the dribble-simulating surface angle adjustment value, a surface normal of a segment of the surface on the path; and
   determining, based on the adjusted surface normal, a next spatial position of the simulated ball.

2. The method of claim 1, wherein the likelihood of ball dribbling further depends on a type of the simulated terrain.

3. The method of claim 1, wherein the dribble-simulating surface angle adjustment range further depends on a type of the simulated terrain.

4. The method of claim 1, wherein the dribbling criterion compares the likelihood of ball dribbling to a pseudo-random value generated by a random number generator.

5. The method of claim 4, wherein the random number generator is pre-seeded by a value derived from a current position of the simulated ball.

6. The method of claim 1, wherein choosing the dribble-simulating surface angle adjustment value is performed based on a pseudo-random value generated by a random number generator.

7. The method of claim 6, wherein the random number generator is pre-seeded by a value derived from a product of coordinates of a current position of the simulated ball.

8. A system, comprising:
   a memory; and
   a processor, communicatively coupled to the memory, the processor configured to:
      determine a current spatial position of a simulated ball rolling on a surface of a simulated terrain;
      determine, based on a slope of the surface of the simulated terrain, a likelihood of ball dribbling;
      identify a segment of a path of the simulated ball over the surface from the current spatial position of the simulated ball, such that a dribbling criterion based on the likelihood of ball dribbling is satisfied on the segment of the path;
      determine, based on a speed of the simulated ball, a dribble-simulating surface angle adjustment range;
      choose a dribble-simulating surface angle adjustment value from the dribble-simulating surface angle adjustment range;
      adjust, based on the dribble-simulating surface angle adjustment value, a surface normal of a segment of the surface on the path; and
      determine, based on the adjusted surface normal, a next spatial position of the simulated ball.

9. The system of claim 8, wherein the likelihood of ball dribbling further depends on a type of the simulated terrain.

10. The system of claim 8, wherein the dribble-simulating surface angle adjustment range further depends on a type of the simulated terrain.

11. The system of claim 8, wherein the dribbling criterion compares the likelihood of ball dribbling to a pseudo-random value generated by a random number generator.

12. The system of claim 11, wherein the random number generator is pre-seeded by a value derived from a current position of the simulated ball.

13. The system of claim 8, wherein choosing the dribble-simulating surface angle adjustment value is performed based on a pseudo-random value generated by a random number generator.

14. The system of claim 13, wherein the random number generator is pre-seeded by a value derived from a product of coordinates of a current position of the simulated ball.

15. A computer-readable non-transitory storage medium comprising executable instructions that, when executed by a computing device, cause the computing device to:
   determine a current spatial position of a simulated ball rolling on a surface of a simulated terrain;
   determine, based on a slope of the surface of the simulated terrain, a likelihood of ball dribbling;
   identify a segment of a path of the simulated ball over the surface from the current spatial position of the simulated ball, such that a dribbling criterion based on the likelihood of ball dribbling is satisfied on the segment of the path;

determine, based on a speed of the simulated ball, a dribble-simulating surface angle adjustment range;

choose a dribble-simulating surface angle adjustment value from the dribble-simulating surface angle adjustment range;

adjust, based on the dribble-simulating surface angle adjustment value, a surface normal of a segment of the surface on the path; and determine, based on the adjusted surface normal, a next spatial position of the simulated ball.

16. The computer-readable non-transitory storage medium of claim 15, wherein the likelihood of ball dribbling further depends on a type of the simulated terrain.

17. The computer-readable non-transitory storage medium of claim 15, wherein the dribble-simulating surface angle adjustment range further depends on a type of the simulated terrain.

18. The computer-readable non-transitory storage medium of claim 15, wherein the dribbling criterion compares the likelihood of ball dribbling to a pseudo-random value generated by a random number generator.

19. The computer-readable non-transitory storage medium of claim 18, wherein the random number generator is pre-seeded by a value derived from a current position of the simulated ball.

20. The computer-readable non-transitory storage medium of claim 15, wherein choosing the dribble-simulating surface angle adjustment value is performed based on a pseudo-random value generated by a random number generator.

* * * * *